United States Patent
Fertell et al.

(10) Patent No.: US 6,629,140 B1
(45) Date of Patent: Sep. 30, 2003

(54) METHOD OF CONTROLLING AN INTERNET WEB BROWSER IN THE ABSENCE OF KEY ACTIVITY ON A COMPUTER

(75) Inventors: David A. Fertell, Chester Springs, PA (US); Joseph I. Field, Jr., Herndon, PA (US)

(73) Assignee: Pearl Software, Inc., Exton, PA (US)

( * ) Notice: Subject to any disclaimer, the term of this patent is extended or adjusted under 35 U.S.C. 154(b) by 0 days.

(21) Appl. No.: 09/522,580

(22) Filed: Mar. 10, 2000

Related U.S. Application Data

(60) Provisional application No. 60/123,803, filed on Mar. 11, 1999.

(51) Int. Cl.[7] .............................................. G06F 15/173
(52) U.S. Cl. ........................ 709/224; 709/203; 709/219; 370/328
(58) Field of Search .................................. 709/224, 203, 709/219; 705/14, 26; 707/104.1; 700/83; 370/328; 348/734; 345/764; 725/112

(56) References Cited

U.S. PATENT DOCUMENTS

| | | | | |
|---|---|---|---|---|
| 5,781,894 A | * | 7/1998 | Petrecca et al. .............. 705/14 |
| 5,895,454 A | * | 4/1999 | Harrington .................... 705/26 |
| 5,905,865 A | * | 5/1999 | Palmer et al. ............... 725/112 |
| 6,128,655 A | * | 10/2000 | Fields et al. ................. 709/219 |
| 6,130,726 A | * | 10/2000 | Darbee et al. ............... 348/734 |
| 6,157,943 A | * | 12/2000 | Meyer ......................... 709/203 |
| 6,282,548 B1 | * | 8/2001 | Burner et al. ............. 707/104.1 |
| 6,295,061 B1 | * | 9/2001 | Park et al. .................... 345/764 |
| 6,314,451 B1 | * | 11/2001 | Landsman et al. .......... 709/203 |
| 6,330,231 B1 | * | 12/2001 | Bi ............................... 370/328 |
| 6,404,442 B1 | * | 6/2002 | Hilpert et al. ............... 345/727 |
| 6,480,753 B1 | * | 11/2002 | Calder et al. .................. 700/83 |

* cited by examiner

Primary Examiner—David Wiley
Assistant Examiner—Tammy Nguyen
(74) Attorney, Agent, or Firm—Webb Ziesenheim Logsdon Orkin & Hanson, P.C.

(57) ABSTRACT

A mouse and/or keyboard of a computer is monitored for actuation of a key thereof. A duration of no key actuation is determined and the duration is compared to a predetermined duration. In response to the duration of no key actuation equaling or exceeding the predetermined duration, an Internet Web Browser active on the computer is caused to retrieve a predetermined Internet Web Page from the Internet.

21 Claims, 2 Drawing Sheets

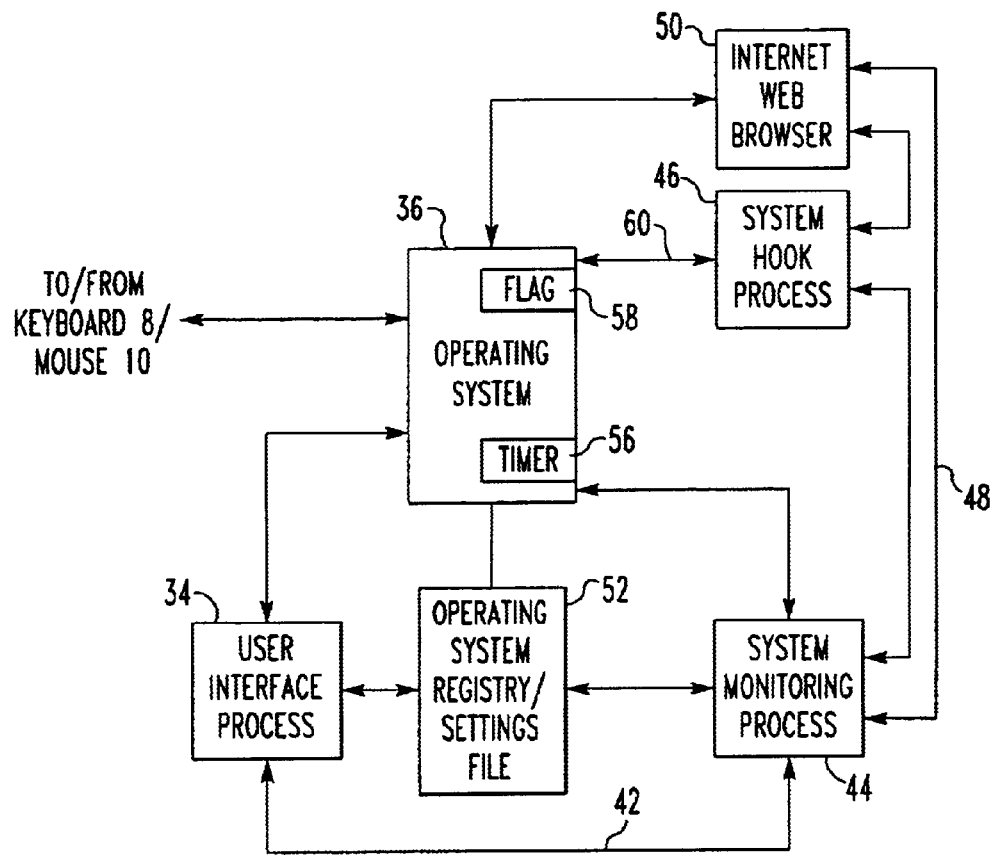

METHOD OF CONTROLLING AN INTERNET WEB BROWSER IN THE ABSENCE OF KEY ACTIVITY ON A COMPUTER

CROSS REFERENCE TO RELATED APPLICATION

This application claims priority from U.S. Provisional Patent Application Ser. No. 60/123,803, filed Mar. 11, 1999 and entitled "Software for Monitoring Internet Activity".

BACKGROUND OF THE INVENTION

1. Field of the Invention

The present invention relates to Internet Web Browsers and, more particularly, to the uniform resource locator (URL) displayed by an Internet Web Browser on a display of a computer after a prolonged duration of no user interaction with the computer.

2. Background Art

A computer operating system, such as Windows, typically includes a screen saver which becomes active after a programmed idle time of no key actuation on a keyboard and/or mouse of the computer. When activated, the screen saver displays on a display of the computer a blank screen or a programmed display of moving shapes and/or figures which avoid a static image from being "burned" into the phosphor of the display. A typical Windows screen saver includes a dialog box which receives the idle time and from which a particular style screen saver, e.g., the blank screen or the programmed display, can be selected from a pull down menu. In operation, in the absence of a key actuation on the mouse and/or the keyboard of the computer for the idle time, the computer causes the screen saver to display the blank screen or the programmed display on the display of the computer.

There is a growing need to control the Internet Web Page displayed by an Internet Web Browser on the display of a computer to avoid the display of objectionable or undesired information thereon. This control is particularly needed for computer displays that are accessible to or viewable to the general public, such as displays visible in libraries, building reception areas and restaurants to name a few.

It is, therefore, an object of the present invention to provide a method for controlling the Internet Web Page displayed by an Internet Web Browser on the display of a computer as a function of the actuation of a key of a mouse and/or keyboard of the computer. Still other objects of the present invention will become apparent to those of ordinary skill in the art upon reading and understanding the following detailed description.

SUMMARY OF THE INVENTION

Accordingly, I have invented a method of controlling an Internet Web Browser active on a computer. The method includes monitoring a mouse or keyboard of the computer for actuation of a key thereof and determining a duration of no key actuation. The duration of no key actuation is compared to a predetermined duration and, in response to the duration of no key actuation equaling or exceeding the predetermined duration, causing an Internet Web Browser active on the computer to connect to a predetermined Internet Web Page.

Preferably, the computer receives the predetermined duration and a uniform resource locator (URL) corresponding to the predetermined Internet Web Page in a dialog box viewable on a display of the computer. The predetermined duration and the URL are stored in the computer. In response to the duration of no key actuation equaling exceeding the predetermined duration, the stored URL is supplied to the Internet Web Browser which supplies the URL to the Internet.

Preferably, a flag and a timer are established in the computer for tracking the duration of no key actuation. Upon commencing the monitoring of the mouse or keyboard of the computer for actuation of a key, the timer is initialized and the flag is initialized to a de-asserted state. In response to actuation of a key, the flag is asserted and the timer is initialized. The flag is maintained in the de-asserted state in the absence of the actuation of a key. If the flag is asserted in response to actuation of a key, the flag is once again de-asserted after a delay interval. The timer is incremented when the flag is de-asserted. More generally, the determination of the duration of no key actuation is initialized after each key actuation.

The determination of no key actuation can be made in respect of a specific application program, such as the Internet Web Browser. Hence, if a user is using another application program, such as a word processor, and no key actuation is directed to the Internet Web Browser for the predetermined duration, the stored URL is retrieved and supplied to the Internet Web Browser which supplies the URL to the Internet.

I have also invented a method of controlling a computer that includes receiving in the computer a first idle time and a first URL corresponding to an Internet Web Page. In response to receiving the first idle time and the first URL, a flag and a timer are established in the computer. The flag is set to an asserted state and the timer is initialized when a key of the keyboard or a mouse of the computer is actuated. The flag is set to a de-asserted state in response to no actuation of a key of the keyboard or the mouse for a predetermined delay interval after the flag is set to the asserted state. The timer is incremented when the flag is in the de-asserted state and a value the timer is compared with the first idle time. When the value of the timer equals or exceeds the first idle time, the first URL is supplied to an Internet Web Browser.

A second idle time can be received in the computer and compared with the value of the timer. The first URL can be supplied to the Internet Web Browser when the value of the timer equals or exceeds the second idle time. Alternatively, a second URL can be received in the computer and the first idle time can be compared with value of the timer. When the value of the timer equals or exceeds the first idle time, the second URL can be supplied to the Internet Web Browser. Lastly, the computer can receive a second idle time and a second URL. The second idle time can be compared to the value of the timer and when the value of the timer equals or exceeds the second idle time, the second URL can be supplied to the Internet Web Browser. In the absence of an active Internet Web Browser, the attempted supply of a URL thereto is disregarded.

Lastly, I have invented a method of controlling an Internet Web Browser displayed on a display of a computer. The method includes initiating on a computer a user interface process which receives an idle time and a URL to an Internet Web Page, which stores the URL and the idle time in the computer and which initiates a system monitoring process. The system monitoring process causes a system hook process to be initiated which asserts a flag when a key of a mouse or a keyboard of the computer is actuated. The system monitoring process also initiates a timer and the flag, detects the state of the flag, de-asserts the flag when it is asserted, increments the timer when the flag is de-asserted and causes an active Internet Web Browser to supply to the URL to the Internet when the Internet value of the timer equals or exceeds the idle time.

The idle time and the URL can be received in a dialog box. In response to actuation of a button in the dialog box when the system monitoring process is active, a notice is displayed on the display of the computer indicating that the system monitoring process is active. In response to actuation of the button in the dialog box when the system monitoring process is not active, the system monitoring process is spawned and the computer configured to initiate the system monitoring process upon start-up of the computer. Preferably, the system monitoring process initializes the timer each time the flag is asserted.

Upon initially receiving the idle time and the URL, the user interface process spawns the system monitoring process and, upon receiving a replacement idle time and/or URL, the user interface process stores the replacement idle time and/or URL in the computer.

In response to actuation of another button in the dialog box, the system monitoring process is terminated and the computer is configured to not initiate the system monitoring process upon start-up of the computer.

BRIEF DESCRIPTION OF THE DRAWINGS

FIG. 3 is a block diagram of the various processes implemented by the computer of FIG. 1 in accordance with the present invention; and FIG. 4 is the dialog box of FIG. 2 receiving another URL and another idle time.

DETAILED DESCRIPTION OF THE PREFERRED EMBODIMENT

Figures 1, 2:
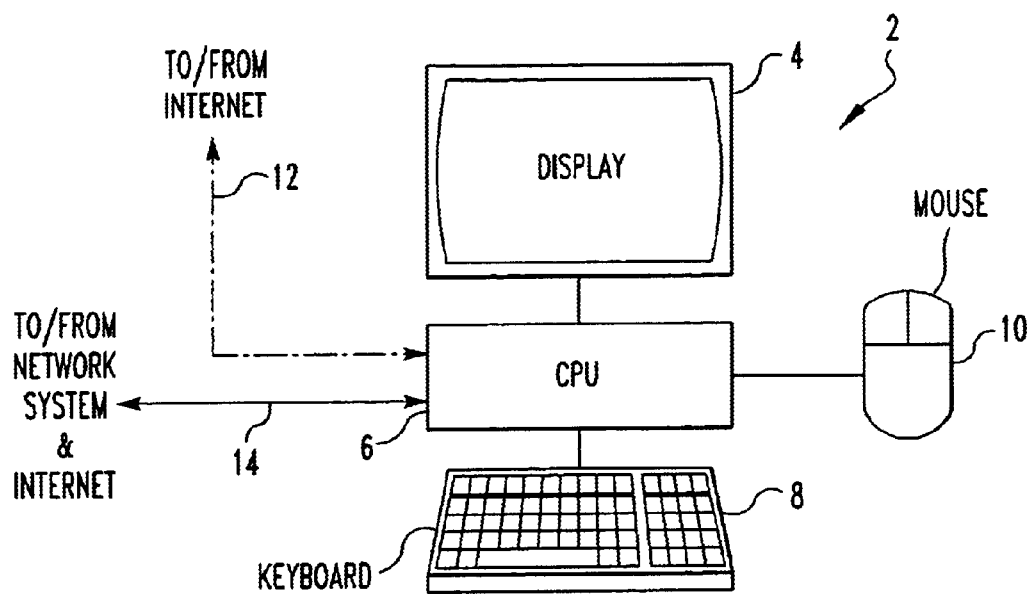
FIG. 1 is a schematic view of a computer which implements the present invention.
FIG. 2 is a dialog box for receiving a URL and an idle time for use in accordance with the present invention.

With reference to FIG. 1, a computer 2 is utilized to implement the present invention which is embodied in a software program which operates computer 2 in a manner known in the art. Computer 2 includes a display 4 which is connected to a central processing unit (CPU) 6 and a keyboard 8 and/or a mouse 10 which are connected to CPU 6 in a manner known in the art. CPU 6 can include a microprocessor, memory, mass storage unit and other such components (not shown) which are common to computers and which are known in the art. CPU 6 can be connected directly to the Internet via a line 12. This connection can be a dial-up service, a DSL line, a T-type line, and the like, for facilitating communication between computer 2 and the Internet. Alternatively, computer 2 can be connected to the Internet via a network line 14 connected to a computer network system. When connected to the Internet via the network system, it would typically not be necessary for CPU 6 to be connected directly to the Internet via line 12.

With reference to FIGS. 2 and 3, upon initial installation and execution of the software program on computer 2, the software program causes a dialog box 20 to appear on display 4. The dialog box 20 includes a URL receiving box 22 for receiving a uniform resource locator of a desired Internet Web Page and an idle time receiving box 24 for receiving a user desired idle time. Preferably, the idle time is expressed in minutes, however, this is not to be construed as limiting the invention. Dialog box 20 also includes a start button 26, a stop button 28 and a close button 30 which are utilized in manners known in the art.

Upon initial execution of the software program after installation in computer 2, the software program spawns a user interface process 34 under the control of an operating system 36 of computer 2. User interface process 34 causes dialog box 20 to be displayed on display 4 for receiving a desired uniform resource locator (URL) 38 in URL receiving box 22 and a desired idle time 40 in idle time receiving box 24 in a manner known in the art. Once URL 38 and idle time 40 are received in boxes 22 and 24, respectively, start button 26 can be activated in a manner known in the art. When start button 26 is activated, user interface process 34 attempts to establish an inter-process communication link 42 with a system monitoring process 44.

When the software program is first installed and executed on computer 2, system monitoring process 44 does not exist. Thus, the first time user interface process 34 attempts to establish inter-process communication link 42 with the system monitoring process 44, no communication can be established. Under this circumstance, user interface process 34 starts or spawns system monitoring process 44. Once spawned, system monitoring process 44 is saved on computer 2 for use during subsequent restarts of computer 2. User interface process 34 also configures operating system 36 to start system monitoring process 44 when computer 2 restarts.

When system monitoring process 44 is started by user interface process 34 or operating system 36, system monitoring process 44 requests operating system 36 to initiate a system hook process 46. System monitoring process 44 also establishes an inter-process communication link 48 with an Internet Web Browser 50 which is active on computer 2. If the Internet Web Browser 50 is not active on computer 2, the attempt to establish inter-process communication link 48 is disregarded. Thereafter, system monitoring process 44 monitors for the activation of the Internet Web Browser 50 and establishes the inter-process communication link 48 therewith.

Activating start button 26 in dialog box 20 causes user interface process 34 to save URL 38 and idle time 40 to an operating system registry or settings file 52 of operating system 36. At an appropriate time after being started by user interface process 34, system monitoring process 44 reads URL 38 and idle time 40 from settings file 52. System monitoring process 44 also establishes an event flag 58 and a timer variable as a timer 56.

System hook process 46 sets flag 58 to a first, asserted state through an inter-process communication link 60 with operating system 36. In response to actuation of a key on keyboard 8 and/or mouse 10, operating system 36 notifies system hook process 46 of such actuation. Upon receiving notification of the actuation of a key on keyboard 8 and/or mouse 10, system hook process 46 asserts flag 58 as an indication of such actuation. In FIG. 3, flag 58 and timer 56 are shown associated with operating system 36, however, this is not to be construed as limiting the invention.

System monitoring process 44 monitors the state of flag 58. In response to detecting flag 58 is asserted, system monitoring process 44 de-asserts flag 58. Preferably, system monitoring process 44 delays de-asserting flag 58 for a predetermined delay interval, e.g., three seconds, after flag 58 is asserted. Each actuation of a key of keyboard 8 and/or mouse 10 asserts flag 58, initializes the delay interval and initializes timer 56.

In the absence of the actuation of a key of keyboard 8 and/or mouse 10 for the delay interval, the system monitoring process 44 de-asserts flag 58 and commences incrementing timer 56 at a rate which can be translated into a time during which no actuation of a key of keyboard 8 and/or mouse 10 occurs.

System monitoring process 44 compares a time corresponding to the value of timer 56 with idle time 40. When the time represented by the value of timer 56 is greater than or equal to idle time 40, system monitoring process 44 supplies URL 38 to Internet Web Browser 50. In response to receiving URL 38, Internet Web Browser 50 outputs URL 38 to the Internet via line 12 or network line 14. If the Internet Web Page corresponding to URL 38 is active, it is returned via the Internet to computer 2 for display on display 4. If the Internet Web Page corresponding to URL 38 is not active, a timer (not shown) of the Internet Web Browser 50 expires after a predetermined interval of no response from the Internet and Internet Web Browser 50 displays a suitable notice on display 4.

With reference to FIG. 4, and with continuing reference to FIGS. 1–3, if during the operation of system monitoring process 44 it becomes desirable to modify the URL 38 and/or idle time 40 stored in settings file 52, user interface process 34 can be executed to display dialog box 20 on display 4. As shown in FIG. 4, another URL 64 can be received in URL receiving box 22 and/or another idle time 66 can be received in idle time receiving box 24. Thereafter, when start button 26 is selected, the other URL 64 and/or the other idle time 66 overwrites the previous value of URL 38 and/or idle time 40 stored in settings file 52. Absent entering another URL 64 and/or another idle time 66 in the respective receiving boxes 22 and 24, the previous values of URL 38 and/or idle time 40 are retained in the settings file 52 when start button 26 is selected.

In response to settings file 52 receiving URL 64 and/or idle time 66, system monitoring process reads URL 64 and/or idle time 66 from settings file 52. To avoid inadvertent replacement of URL 38 and/or idle time 40 in settings file 52, when dialog box 20 is displayed on display 4, system monitoring process 44 also displays on display 4 a notice that system monitoring process 44 is active. This notice indicates that URL 38 and/or idle time 40 are stored in computer 2.

If it is desired to deactivate system monitoring process 44, user interface process 34 is executed to display dialog box 20 on display 4. Next, stop button 28 is selected in dialog box 20. In response to selecting stop button 28, user interface process 34 sends a "stop" command to system monitoring process 44 via inter-process communication link 42. In response to receiving this "stop" command, system monitoring process 44 terminates monitoring flag 58 and/or incrementing timer 56. Moreover, in response to selecting stop button 28, user interface process 34 configures operating system 36 to not start system monitoring process 44 when computer 2 restarts.

The present invention has been described with reference to the preferred embodiment. Obvious modifications and alterations will occur to others upon reading and understanding the preceding detailed description. For example, the key actuation that asserts flag 58 and initializes timer 56 can be one that is directed to Internet Web Browser 50. Hence, if key actuation is directed to another program, e.g., a word processor, active on computer 2 at the same time Internet Web Browser 50 is active, key actuation directed to the other program, but not Internet Web Browser 50, will not assert flag 58 or initialize timer 56. Thus, in the absence of a key actuation directed to Internet Web Browser 50 for at least idle time 40, URL 38 will be supplied to Internet Web Browser 50 for supply to the Internet regardless of key actuations directed to the other programs active on computer 2. Moreover, while the present invention is described in connection with supplying a URL to one Internet Web Browser, if computer 2 includes two or more Internet Web Browsers, the present invention will supply the URL stored in settings file 52 to each Internet Web Browser when the value of timer 56 equals or exceeds the idle time stored in settings file 52. It is intended that the invention be construed as including all such modifications and alterations insofar as they come within the scope of the appended claims or the equivalents thereof.

We claim:

1. A method of controlling an Internet Web Browser active on a computer, the method comprising the steps of:
   (a) monitoring a mouse or keyboard of the computer for actuation of a key thereof;
   (b) determining a duration of no key actuation;
   (c) comparing the duration of no key actuation to a predetermined duration; and
   (d) in response to the duration of no key actuation equaling or exceeding the predetermined duration, causing an Internet Web Browser active on the computer to connect to a predetermined Internet Web Page.

2. The method as set forth in claim 1, further including the steps of:
   receiving in the computer the predetermined duration and a uniform resource locator (URL) corresponding to the predetermined Internet Web Page; and
   storing the predetermined duration and the URL.

3. The method as set forth in claim 2, wherein further including the steps of:
   retrieving the stored URL;
   supplying the URL to the Internet Web Browser; and
   in response to the Internet Web Browser receiving the URL, supplying the URL to the Internet.

4. The method as set forth in claim 1, wherein step (a) includes the steps of:
   establishing in the computer a flag and a timer for tracking the duration of no key actuation;
   initializing the flag to a de-asserted state; and
   in response to actuation of a key, asserting the flag and initializing the timer.

5. The method as set forth in claim 4, wherein step (b) includes the steps of:
   maintaining the flag in the de-asserted state in the absence of the actuation of a key; and
   incrementing the timer when the flag is de-asserted.

6. The method as set forth in claim 5, wherein step (c) includes the step of comparing a value of the timer to the predetermined duration.

7. The method as set forth in claim 6, wherein step (d) includes the steps of:
   in response to the value of the timer equaling or exceeding the predetermined duration, retrieving the stored URL;
   supplying the URL to the Internet Web Browser; and
   in response to receiving the URL, the Internet Web Browser supplies the URL to the Internet.

8. The method as set forth in claim 1, further including the step of initializing the timer after each key actuation.

9. The method as set forth in claim 1, wherein the key actuation is directed to the Internet Web Browser.

10. A method of controlling a computer comprising the steps of:
  (a) receiving in the computer a first idle time and a first uniform resource locator (URL) corresponding to an Internet Web Page;
  (b) in response to receiving the first idle time and the first URL, establishing a flag and a timer;
  (c) setting the flag to an asserted state and initializing the timer when a key of a keyboard and/or a mouse of the computer is actuated;
  (d) setting the flag to a de-asserted state in response to no actuation of a key of the keyboard and/or the mouse for a delay interval after the flag is set to the asserted state;
  (e) incrementing the timer when the flag is in the de-asserted state;
  (f) comparing a value of the timer with the first idle time; and
  (g) supplying the first URL to an Internet Web Browser when the value of the timer equals or exceeds the first idle time.

11. The method as set forth in claim 10, further comprising the steps of:
  receiving in the computer a second idle time;
  comparing a value time the timer with the second idle time; and
  supplying the first URL to the Internet Web Browser when the value time of the timer equals or exceeds the second idle time.

12. The method as set forth in claim 10, further comprising the steps of:
  receiving in the computer a second URL;
  comparing a value of the timer with the first idle time; and
  supplying the second URL to the Internet Web Browser when the value of the timer equals or exceeds the first idle time.

13. The method as set forth in claim 10, further comprising the steps of:
  receiving in the computer a second idle time and a second URL;
  comparing a value of the timer with the second idle time; and
  supplying the second URL to the Internet Web Browser when the value of the timer equals or exceeds the second idle time.

14. The method as set forth in claim 13, wherein in response to receiving the second idle time and/or the second URL, the computer displays on a display a notice indicative of the first idle time and the first URL being stored in the computer.

15. The method as set forth in claim 10, wherein step (g) includes the steps of:
  in response to receiving the first URL, an active Internet Web Browser supplies the URL to the Internet; and
  in the absence of an active Internet Web Browser, the attempted supply of the first URL thereto is disregarded.

16. A method of controlling an Internet Web Browser displayed on a display of a computer, the method comprising the steps of:
  (a) initiating on a computer a user interface process which receives an idle time and a uniform resource locator (URL) corresponding to an Internet Web Page, which stores the URL and the idle time in the computer and which initiates a system monitoring process; and
  (b) initiating on the computer a system hook process which asserts a flag when a key of a mouse or keyboard of the computer is actuated, wherein the system monitoring process:
    initiates a timer and the flag;
    detects the state of the flag;
    de-asserts the flag when it is asserted;
    increments the timer when the flag is de-asserted; and
    causes an active Internet Web Browser to supply the URL to the Internet when the value of the timer equals or exceeds the idle time.

17. The method as set forth in claim 16, wherein step (a) includes the steps of:
  receiving the idle time and the URL in a dialog box;
  in response to actuation of a button in the dialog box when the system monitoring process is active, supplying to a display of the computer a notice that indicates that the system monitoring process is active;
  in response to actuation of the button in the dialog box when the system monitoring process is not active, spawning the system monitoring process and configuring the computer to initiate the system monitoring process upon start-up of the computer.

18. The method as set forth in claim 16, wherein the system monitoring process initializes the timer each time the flag is asserted.

19. The method as set forth in claim 16, wherein:
  upon initially receiving the idle time and the URL, the user interface process spawns the system monitoring process; and
  upon receiving a replacement idle time and/or a replacement URL, the user interface process stores the replacement idle time and/or URL in the computer.

20. The method as set forth in claim 17, wherein in response to actuation of another button in the dialog box, terminating the system monitoring process and configuring the computer to not initiate the system monitoring process upon start-up of the computer.

21. The method as set forth in claim 16, wherein:
  the user interface process initiates the system monitoring process;
  the user interface process and the system monitoring process communicate via an inter-process communication link therebetween;
  the system monitoring process causes the system hook process to initialize; and
  the system monitoring process and the Internet Web Browser communicate via an inter-process communication link therebetween.

* * * * *